March 24, 1970   C. W. EARP   3,503,071
RADIO NAVIGATION SYSTEM
Filed Oct. 23, 1968   2 Sheets-Sheet 1

Inventor
CHARLES W. EARP
By Philiph Bolton
Attorney

United States Patent Office 3,503,071
Patented Mar. 24, 1970

3,503,071
RADIO NAVIGATION SYSTEM
Charles William Earp, London, England, assignor to International Standard Electric Corporation, New York, N.Y., a corporation of Delaware
Filed Oct. 23, 1968, Ser. No. 769,803
Claims priority, application Great Britain, Nov. 16, 1967, 52,142/67
Int. Cl. G01s 3/16, 5/08
U.S. Cl. 343—112
6 Claims

ABSTRACT OF THE DISCLOSURE

A radio navigation system wherein a transmitter is cyclically coupled to three antennas, arranged at the corners of an equilateral triangle, to radiate a position modulated signal which is detected by direction finding aerials and processed by an FM type receiver. The outputs of said receiver are coupled to an oscilloscope and to separate meters to provide left-right homing, reciprocal of distance to fly, approach track guidance and glide path information.

BACKGROUND OF THE INVENTION

Field of the invention

This invention relates to a radio navigation system.

SUMMARY OF THE INVENTION

According to the invention, there is provided a navigation system comprising a plurality of spaced antennas arranged in an array, a transmitter successively coupled to each antenna of said antenna array to radiate a position modulated signal and receiving means for detecting and processing said position modulated signal to obtain distance to said antennas and sense of displacement from a predetermined approach track.

BRIEF DESCRIPTION OF THE DRAWING

A preferred embodiment of the invention will now be described with reference to the accompanying drawings, in which:

As shown in FIGURE 1, the ground system is comprised of three simple omni-directional aerials 1, 2 and 3 at ground level, at the corners of an equillateral triangle, the dimension of which should be as large as possible. Length of side of 200 feet would be more than adequate for a small tactical airfield. Though some advantages could be derived from the use of four radiations at the corners of a square, attention will be confined to minimum complexity of ground equipment.

A transmitter 30 signal is coupled successively to three serials by commutator 31, each radiation having a duration of, for example, 1/30 second. Frequency bandwidth for the associated receiver may be as small as 50 kHz., so that VHF or UHF waves may be used.

The radio frequency chosen is not critical, but 1500 mHz. is suggested, offering a good compromise between all-around range with limited power, and the aperture or baseline of the aerial system of the mobile craft. Thus it also becomes possible to derive power from a single crystal-controlled source, and to use orderly cyclical time sharing instead of random "flashing" of separate microwave oscillators at the three aerial positions.

It is also to be noted that the comparatively narrow-band permits ease of frequency allocation for a large number of adjacent airfields.

Figure 1:
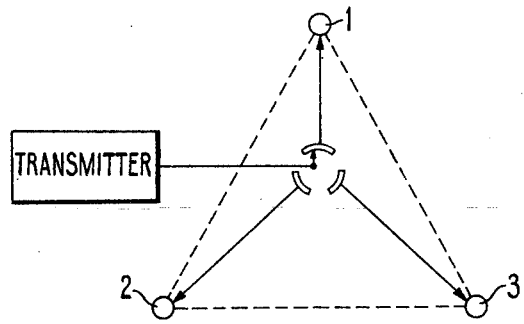
FIGURE 1 is a plan view of the ground transmitter arrangement.
Figure 2:
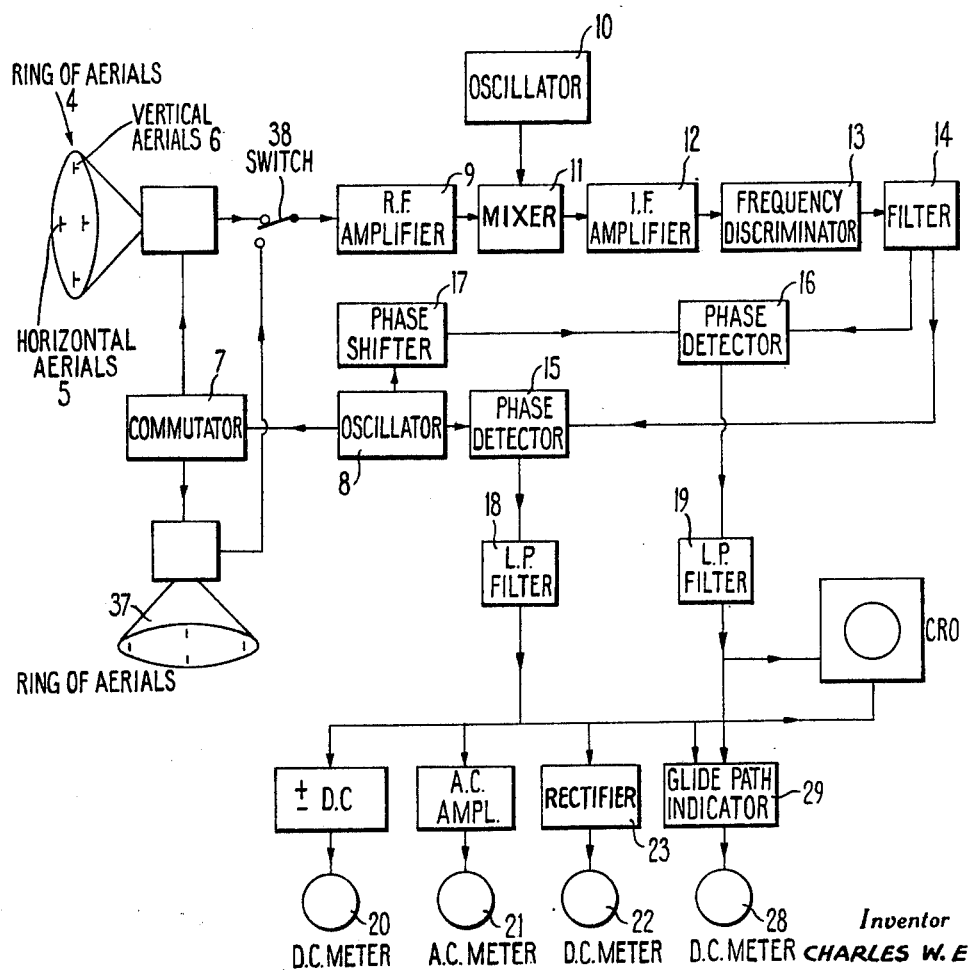
FIGURE 2 is a block circuit diagram of a receiver using the radiations of the transmitter of FIGURE 1 to obtain navigational information.

The aircraft receiver as shown in FIGURE 2, uses a commutated aerial Direction Finding (C.A.D.F.) type of equipment. A forward-looking ring of aerials 4 comprised of four units, one horizontal pair 5 and one vertical pair 6, are commutated in turn to the receiver under control of a 4-phase commutator 7 and commutator oscillator 8.

Any commutation period from 1 millisecond per aerial, downwards, is adequate, but a duration of 0.25 millisecond is preferred, so that the resultant phase modulation imposed on the received signal is easily detected. Also, with the high commutation rate, the equipment is able to operate on the short signals of other navigation systems. For example, it would be possible to display the true solid-angle direction of aircraft radiating anti-collision signals in the same frequency band.

The receiver is of normal design for the reception of frequency-modulated signals, comprising an RF amplifier 9, beat oscillator 10, mixer 11, IF amplifier 12, and frequency discriminator 13, but output from the frequency discriminator is turned via tuned filter 14 to the commutator cyclic frequency of 1 kHz. This 1 kHz. output has an amplitude proportional to the cosine of angle of signal bearing with respect to heading of the aircraft, and phase will depend upon the resolved vertical and horizontal components of the angle. Hence, differential detection with each of two quadrature-phased reference waves at 1 kHz. derived from the aerial commutation yields DC voltages corresponding to vertical and horizontal components, respectively of bearing angle with respect to aircraft heading.

This differential detection is by phase detector 15 having inputs from the oscillator 8 and the tuned output of the frequency discriminator filter 14 for the horizontal components, and by phase detector 16 having inputs from a 90° phase shifter 17 and the tuned output of the frequency discriminator 14 for the vertical components.

At great distance from the ground beacon, these DC values will be comparatively steady, representing the vertical and horizontal components of bearing of the beacon with respect to aircraft heading. At shorter ranges, the slightly differing bearings from the three separate radiations from ground will cause modulation of the DC values. The output of detector 15 is modulated by low pass filter 18 to yield the successive horizontally deflected bearings, constituting an X-wave, and the output of detector 16 is modulated by low pass filter 19 to yield the successive vertically deflected bearings, constituting a Y-wave.

These X- and Y-waves can be applied to the deflecting elements of a cathode ray oscillograph 32 (C.R.O.) to yield a visual, "head-up," true solid angle 3-spot display of the ground system. The 3-spot C.R.O. display is capable of giving the following information:

(1) Overall left-right displacement of all spots gives a left-right "homing" instruction.

(2) Horizontal amplitude of the display is proportional to reciprocal of distance from the beacon.

(3) Horizontal deflection of the middle spot with respect to the outer spots gives angular deflection from the track defined by the perpendicular bisectors of one side of the ground system triangle.

(4) When on track, ratio of vertical to horizontal dimensions of display is proportional to sine of angle of elevation, hence giving an indication of glide angle. For example, vertical sensitivity could be magnified to give an equilateral triangle display of a chosen glide angle.

(5) When on track, angular tilt of display is a display of horizon, or aircraft banking.

(6) Vertical deflection of the whole 3-spot display yields angle of backward or forward tilt of aircraft from the glide angle.

(7) The display yields a forward-looking solid angle display of aircraft emitting anti-collision signals in the same frequency band.

With increased range, the 3-spot display becomes too small to yield useful information. However, the X- and Y-waves capable of giving a C.R.O. display can be processed for separate meter displays of a number of useful facilities.

(1) A left-right homing display is provided by measuring the DC component of the X-wave on a centre-zero DC meter 20.

(2) A display of reciprocal of distance to fly is provided by measuring the amplitude of the AC component of the X-wave on an AC meter 21.

(3) Approach track guidance is provided for each of the six azimuths which correspond to perpendicular bisectors of sides of the triangular ground system.

This is displayed by a centre-zero DC meter 22 by first applying the AC component of the X-wave to a rectifier arrangement 23 which detects asymmetry of positive and negative peaks, and derives a positive or negative DC signal accordingly. Maximum deflection of a track meter would correspond to azimuths parallel with the sides of the ground triangle.

Figure 3:
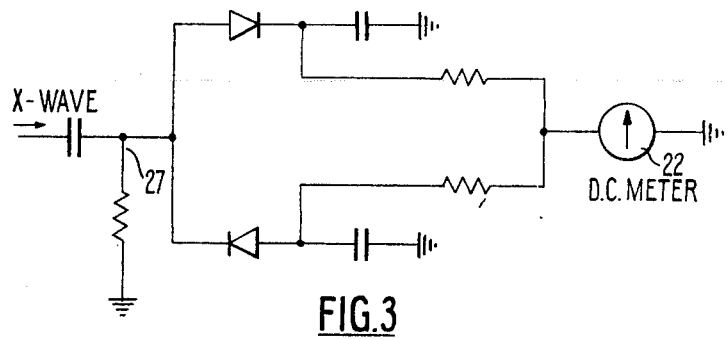
FIGURE 3 is a circuit diagram for obtaining approach track information.
Figure 4A:
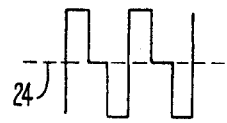
FIGURES 4A, 4B and 4C show waveforms relating to approach track information.
Figure 4B:
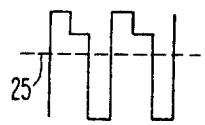
Figure 4C:
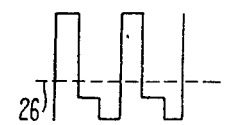

A suitable rectifier arrangement is shown in FIGURE 3. The X-wave, when on track, is symmetrical about a mean level 24, as shown in FIGURE 4A. FIGURES 4B and 4C show the X-wave when left of track and right of track respectively. The mean levels 25 and 26 in FIGURES 4B and 4C respectively differ from the on track mean which is determined by a voltage on line 27 in FIGURE 3. The centre-zero track meter 22 accordingly indicates any track deviation to left or right.

Figure 5:
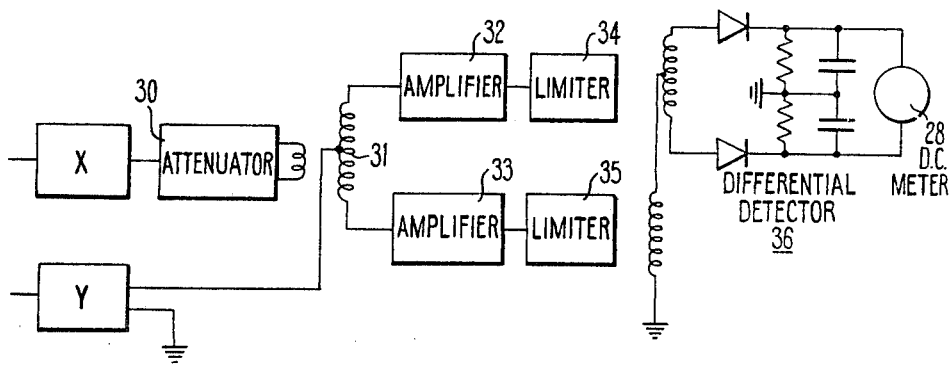
FIGURE 5 is a circuit diagram for obtaining guide path information.

(4) Glide path indication is provided by meter 28 which is centre-zero DC meter driven by a derived positive or negative current after selection of a particular glide angle by a circuit arrangement 29 shown in detail in FIGURE 5. Glide path indication is achieved by selecting the 10 Hz. components of the X- and Y-waves and adjusting by attenuator 30 the X component so that both waves are of the same amplitude for the chosen glide angle. The two components at 10 Hz. are in quadrature phase relationship, and are added and subtracted by a sum and difference transformer 31 to yield two new waves which are also equal in amplitude and in quadrature. Each of these derived waves is now amplified by amplifiers 32 and 33 respectively and limited by limiters 34 and 35 respectively before application as the two inputs to a differential detector arrangement 36, from which positive or negative DC output is directly proportional to elevation angular displacement from the chosen glide angle.

In order to avoid the necessity for the aircraft to change heading in order to search for the ground beacon, a horizontal D/F array 37 can be provided in order to display direction of the beacon with respect to aircraft heading and connectable to the receiver on operation of the switch 38. This array would be used only to determine the quickest maneuver for correct heading for approach, after which it would be replaced by the forward-looking array for the facilities of homing, track guidance, distance measurement and glide path.

I claim:

1. A receiver for a navigation system wherein a plurality of spaced antennas in a closed array are successively coupled to a transmitter to provide a position modulated signal comprising:
    commutated aerials;
    a commutator.
    an oscillator controlling the commutation rate of said commutator;
    means coupled to said aerials for selecting the output of one of said commutated aerials;
    an FM receiver coupled to said selecting means;
    first and second phase detectors coupled to the output of said FM receiver;
    a phase shifter;
    means coupling said oscillator to said first phase detector and to the second phase detector via said phase shifter; and
    means coupled to said phase detectors for providing at least one navigational display.

2. A receiver, according to claim 1, wherein navigational display means comprises means for providing a left-right homing display including a DC amplifier, a low pass filter, and a DC meter coupled to said filter by said DC amplifier.

3. A receiver, according to claim 1, wherein navigational display means comprises means for providing reciprocal of distance to fly including an AC amplifier, a low pass filter and an AC meter coupled to said filter by said AC amplifier.

4. A receiver, according to claim 1, wherein navigational display means comprises means for providing approach track guidance including a rectifier arrangement, a low pass filter and a DC meter coupled to said filter by said rectifier arrangement.

5. A receiver, according to claim 1, wherein navigational display means comprises means for providing sense of displacement including a first low pass filter, a second low pass filter and a CRO tube coupled to said first and second filters.

6. A receiver, according to claim 1, wherein navigational display means comprises means for providing glide path indication including a first low pass filter, a second low pass filter, a glide path detector coupled to said first and second filters and a DC meter coupled to said glide path detector.

References Cited

UNITED STATES PATENTS

| | | | |
|---|---|---|---|
| 2,003,933 | 6/1935 | Greig | 343—121 |
| 2,226,860 | 12/1940 | Greig | 343—118 |

RODNEY D. BENNETT, JR., Primary Examiner

R. E. BERGER, Assistant Examiner

U.S. Cl. X.R.

343—101, 113, 118, 121